United States Patent [19]

Farcnik

[11] 4,041,000

[45] Aug. 9, 1977

[54] MAKING FIREPROOF NON-POLLUTING LIQUID COATING COMPOSITION

[76] Inventor: Alexander Farcnik, 9850 Reseda Blvd., Apt. 311, Northridge, Calif. 91403

[21] Appl. No.: 640,287

[22] Filed: Dec. 12, 1975

[51] Int. Cl.² .................................................. C08L 31/04
[52] U.S. Cl. .......................... 260/29.6 B; 260/29.6 S; 260/29.6 BM; 260/29.6 M
[58] Field of Search ...................... 260/29.6 B, 29.6 S, 260/29.6 BM, 29.6 M, 42.22, 45.75 W, DIG. 24; 252/8.1, 62; 106/15 FP, 287 S, 38.35

[56] References Cited

U.S. PATENT DOCUMENTS

| | | | |
|---|---|---|---|
| 3,202,567 | 8/1965 | Muri et al. | 106/15 FP |
| 3,707,385 | 12/1972 | Kraemer et al. | 106/15 FP |
| 3,910,798 | 10/1975 | Shires et al. | 106/38.35 |

OTHER PUBLICATIONS

Hackh's Chemical Dictionary, McGraw-Hill, N.Y., 4th Ed., 1972, p. 610.

*Primary Examiner*—M. J. Welsh
*Attorney, Agent, or Firm*—John J. Posta, Jr.

[57] ABSTRACT

The improved fireproof liquid coating composition of the present invention includes water in a substantial proportion as a base or vehicle, in which silica sand, fire clay or the like silica-containing material is dispersed, along with granular zinc oxide, a selected silicate binder and suspending agent such as calcium silicate or sodium silicate, and a minor concentration of a thermoplastic resin binder and suspending agent, such as polyvinyl acetate.

An alkali metal fluorosilicate can also be present, if desired, to help dry the composition when it is applied to a surface to be protected against fire, rain and other elements. Moreover, coloring agents, preferably selected inorganic oxides, can also be present to suitably color the composition. The composition is simple to make up, inexpensive, easy to apply and highly effective when dried on a surface as a hard fire protective durable layer.

9 Claims, No Drawings

MAKING FIREPROOF NON-POLLUTING LIQUID COATING COMPOSITION

BACKGROUND OF THE INVENTION

1. Field of the Invention

The present invention generally relates to protective coatings and more particularly to a fireproof liquid coating composition of improved utility.

2. Prior Art

In view of the fact that conventional home construction has a very high percentage (up to 90% or more) of flammable materials such as wood studs, rafters, joists and other framing, as well as lathe work, wood flooring and sub-flooring and the like, the danger of fire is substantial. It can arise from many sources, including such hidden sources as faulty wiring, etc.

Even small commercial business buildings are fabricated largely with flammable materials and subject to the same hazards. Moreover, most conventional paints and other similar floor, wall and ceiling coating materials and covering are highly flammable and thus add to the fire danger. In recent years efforts have been made to reduce building fire hazards by many means, including more strict electrical codes, fireproof roofing materials, etc. In some instances, flameproofing agents have been applied to walls, ceilings, etc., in the form of liquid coating compositions.

Many so-called flameproof coating compositions include substantial concentrations of one or more gas-releasing components, such as thermally decomposable nitrogen-containing compounds or carbon dioxide-containing compounds, or the like to provide a protective gas blanket when decomposed by heat.

Such compositions, however, usually are severely restricted as to properties and uses, and many really are not very durable and tend to decompose and therefore are unsuitable for exterior use in contact with the elements. The gases released may also be a suffocation hazard. Moreover, such compositions also are usually relatively expensive to prepare and use and may require special application techniques. Because of these drawbacks, such compositions have not met with much success.

Accordingly, a need still remains for a durable, inexpensive, simple but highly effective fireproof coating composition which can be easily applied in a variety of ways and which is suitable for use both on interior and exterior walls, ceilings and the like and even on hidden framing and other construction components. Such composition should itself not create a hazard.

SUMMARY OF THE INVENTION

The foregoing needs have now been satisfied by the improved fireproof, non-polluting liquid coating composition of the present invention. The composition is substantially as set forth in the Abstract above. It is perfectly safe to prepare and use and includes water as the base or vehicle, particulate silica as the main solid constituent, either as sand or fire clay or both, together with particulate zinc oxide, a selected silicate binder and a small concentration of a selected thermoplastic binder and bodying or suspending agent, such as polyvinyl acetate.

A drying agent such as an alkali metal fluorosilicate may be present, if desired, as can be coloring agents, preferably inorganic oxides or the like. The composition can be used on interior walls, ceilings, sub-flooring, framing, etc. and on exterior walls, roof boards, etc. to fully protect the building against fire without generating dangerous gases.

The composition can be easily and simply sprayed, brushed, rolled, troweled and otherwise applied to all manners of surfaces to provide a decorative appearance and a durable, hard sound surface. Moreover, the composition does not employ ingredients which can pollute the ground or atmosphere, since no volatile solvents or strong chemicals are employed. Further advantages are set forth in the following detailed description.

DETAILED DESCRIPTION

Now referring more particularly to the improved composition of the present invention, this composition includes a substantial concentration of water as the base or liquid vehicle. The concentration of water will vary, depending upon the use and intended manner of application of the composition.

Thus, when the composition is to be brushed or rolled on a surface, its water concentration will usually be less then when it is to be sprayed on a surface. Usually, however, the composition contains about 15–30 volume % of water. No organic solvents are used in the liquid coating composition, nor are any harsh dangerous, potentially polluting chemicals employed.

In preparing the improved composition, the water is usually first mixed with the selected silicate binder of the composition. Such silicate is selected from the group consisting of calcium silicate, sodium silicate and mixtures thereof and is usually present in a ratio to the water of about 1:2–3 by volume.

The silicate concentration in volume % in the composition is usually from about 8–10 volume % to about 20 volume %. The concentration of the water-silicate mixture in the coating composition is usually about 25–40 volume %.

Calcium silicate, $CaSiO_3$, is a white mass insoluble in water and is known to be used in industry antacids, adhesives, binders and absorbents. Calcium silicate hydrates are known to be used as coatings for clays and the like.

Sodium silicate can be used in either the liquid or solid form. As a liquid it has the formula $Na_2Si_2O_9 H_2O$, is known as water glass and is soluble in water. As a solid it has the formula $Na_2SiO_3$, is soluble in water and is used commercially as an adhesive, binder and the like. Either silicate, hydrated or unhydrated, can be used.

It will also be understood that, if necessary, another silicate having binding properties could be used, for example, potassium silicate, but with somewhat less desirable results. Potassium silicate has the formula, as a glass, $SiO_2:K_2O$ (2.1–2.5:1) which is insoluble in water, and as a liquid, $SiO_2:K_2O$ (1.8–3.3:1).

The main solid used in the present composition is a silica-containing refractory solid in finely divided or powdered particulate form. Such solid can be silica sand, $SiO_2$, and/or fire clay or the like silica-containing high temperature refractory.

Silica sand is colorless and insoluble in water. Fireclay is otherwise known as Stowbridge clay, a refractory clay containing more silica and alumina than basic oxides and capable of withstanding temperatures in excess of about 1,600° C. without fuzing. The silica-containing solid refractory is preferably present in 100 U. S. Standard mesh or finer size and in a concentration of about 45–60 volume % of the composition.

A second, important solid refractory utilized in the composition is zinc oxide, $Z_nO$, an amorphous solid, insoluble in water, and known in industry as a mold growth inhibitor, reagent, antiseptic, and refractory. Zinc oxide is present in finely devided particulate form, preferably 100 U. S. Standard mesh or smaller, and in a concentration in the composition usually of about 10–20 volume %.

A small concentration, usually about 0.5 to about 5 volume %, of a selected thermoplastic binder, bodying agent and suspending agent is also present in the composition. This binder is a polyvinyl derivative, preferably polyvinyl acetate, although in certain instances polyvinyl alcohol can be used.

Polyvinyl acetate has the formula $(CH_2 \cdot CH_{00}C \cdot CH_3)_n$ or $(CH_2CHO_2CCH_3)_n$ and is transparent, solid and insoluble in water. It is a known commercial adhesive, size, and binder. It is used in the present composition in finely divided particulate form, preferably of 100 U. S. Standard mesh or finer average size.

Polyvinyl alcohol has the formula $(CH_2CHOH)_m$ and is a water soluble resin, known commercially as a coating and adhesive.

When it is desired to accelerate the drying of the present composition, a selected alkali metal fluorosilicate can be added to the composition, for example, in a concentrate of about 0.5–2 volume % or the like. It is preferred to use sodium fluorosilicate, $Na_2SiF_6$, which is slightly soluble in water and is a known preservative, antiseptic, reagent, etc. However, potassium fluorosilicate, $K_2SiF_6$, can also be used. It has substantially the same properties as the sodium fluorosilicate.

It is also desired in certain instances to color the improved composition. This can be done by adding to the composition a small concentration of a coloring agent, preferably a nonflammable inorganic oxide such as cuprous oxide, $Cu_2O$, for a red color, cupric oxide, $CuO$, for a black color, ferric oxide, $F_{e2}O_3$, for a red color, cobalt blue, $Co(alO_2)_2$, for a blue to green color, cobaltic oxide, $C_{o2}O_3$, or cobalto-cobaltic oxide, $C_{o3}O_4$ for a steel-grey to black color, chromic oxide, $Cr_2O_3$, for a green color, or chrome yellow, $PbCrO_4$, for a yellow color. It will be understood that the described coloring and the drying agent are optional, although desirable.

In preparing the present composition, it is desirable to premix together the silica-containing refractory, zinc oxide, thermoplastic binder, as well as the drying agent and pigment, if any, and then combine the water-inorganic binder mixture therewith. Upon suitable mixing, as by stirring, the composition is ready for use. The following specific examples illustrate certain further features.

EXAMPLE I

The liquid coating composition set forth in Table I below is prepared:

TABLE I

| Ingredients | Amount | Concentration (volume-%) |
|---|---|---|
| liquid: | | |
| sodium silicate (anhydrous) | 405 ml. | 35 |
| water | 810 ml. | |
| solids (100 mesh): | | |
| silica sand | 1,655 ml. | 47 |
| zinc oxide | 595 ml. | 17 |
| polyvinyl acetate | 35 ml. | 1 |
| | 3,500 ml. | 100 |

The liquid is first made up, after which the solids are mixed together, whereupon the liquid is added thereto with stirring, until the solids are uniformly dispersed therein. The resulting composition is brushed on wood 2 × 4 inches studs to a thickness of about one sixteenth inches, allowed to dry for 12 hours and then tested. It is determined that the dried composition protects the studs against charring when a flame is held for 30 seconds to a portion of the thus coated exterior of the studs.

The coating also is durable and hard. Moreover, when fully set, it is waterproof, protecting the studs from swelling when they are soaked in water for 30 minutes. Therefore, the composition is fully protective and durable.

EXAMPLE II

The liquid coating composition set forth in Table II below is prepared:

TABLE II

| Ingredients | Amount | Concentration (volume-%) |
|---|---|---|
| Liquid (suspension): | | |
| calcium silicate (anhydrous) | 34 ml. | 27 |
| water | 68 ml. | |
| solids (100 mesh): | | |
| silica sand | 170 ml. | 45 |
| fire clay | 49 ml. | 13 |
| zinc oxide | 49 ml. | 13 |
| sodium fluorosilicate | 4 ml. | 1 |
| polyvinyl acetate | 4 ml. | 1 |
| | 378 ml. | 100 |

The composition is prepared, as described for the composition of Example I, after which it is rolled and brushed on exterior wooden siding to a thickness of about one sixteenth inch, allowed to dry 4 hours, then tested by holding a flame to a portion thereof for 30 seconds and later chipping off the coating on that portion to examine the siding. No burning of the siding occurs during the test.

When the remaining portion of the coating on the siding is exposed to the elements for 3 months, no significant weathering effects are noted.

In a parallel test, the following composition is prepared:

TABLE III

| Ingredients | Amount | Concentration (volume-%) |
|---|---|---|
| liquid: | | |
| sodium silicate (hydrate) | 200 ml. | 27 |
| water | 600 ml. | |
| solids (about 200 mesh): | | |
| silica sand | 1,200 ml. | 40 |
| zinc oxide | 600 ml. | 20 |
| polyvinyl acetate | 120 ml. | 4 |
| fire clay | 150 ml. | 5 |
| sodium fluorosilicate | 60 ml. | 2 |
| cobalt blue, $(Co(AlO_2)_2$ | 60 ml. | 2 |
| | 2,990 ml. | 100% |

The blue colored composition of Table III is tested in the same manner as the compositions of Tables I and II with idential results, plus also being rolled on an interior wallboard wall of a house to a thickness of about one eighth inch and, after 6 hours, tested for flameproofness by application of a flame to an area thereof for 20 seconds, with no combustion or charring noted. The blue coating makes an attractive interior coating which is stain resistant, hard and durable.

Accordingly, the present composition, as exemplified by the above three compositions, has improved flameproofing properties and is more durable and useful for a variety of applications than the usual types of protective compositions. Various other advantages are set forth in the foregoing.

Various modifications, changes, alterations and additions in the present composition, its components, properties and parameters can be made. All such changes, modifications, alterations and additions as are within the scope of the appended claims form part of the present invention.

What is claimed and desired to be secured by Letters Patent is:

1. An improved fireproof non-polluting liquid coating composition, said composition consisting essentially of:
   a. water as a vehicle;
   b. a silica-containing refractory material in granular form;
   c. pollution-free silicate selected from the group consisting of calcium silicate, sodium silicate and mixtures thereof;
   d. a thermoplastic resin binder;
   e. zinc oxide in granular form; and,
   f. alkali metal fluorosilicate drying agent.

2. The improved coating composition of claim 1 wherein said silicate is calcium silicate.

3. The improved coating composition of claim 2 wherein said composition includes about 27 volume percent, of a mixture of two volume parts of water per volume part of calcium silicate, about 45 volume % of silica sand, about 13 volume % of fire clay, about 13 volume % of zinc oxide, about 1 volume % sodium fluorosilicate as a drying agent, and about 1 volume % of polyvinylacetate binder.

4. The improved coating composition of claim 1 wherein said silicate is sodium silicate.

5. The improved coating composition of claim 1 wherein said thermoplastic binder comprises polyvinyl acetate.

6. The improved coating composition of claim 1 wherein said thermoplastic binder comprises polyvinyl alcohol.

7. The improved coating composition of claim 1 wherein said silica-containing refractory comprises silica sand.

8. The improved coating composition of claim 7 wherein said silica-containing refractory also includes fire clay.

9. The improved coating composition of claim 1 wherein said drying agent comprises sodium fluorosilicate and is present in a minor concentration.

* * * * *